US008081103B2

(12) United States Patent
Yamagiwa

(10) Patent No.: US 8,081,103 B2

(45) Date of Patent: Dec. 20, 2011

(54) REMOTE CONTROLLER, METHOD FOR CONTROLLING THE SAME, AND METHOD FOR MANUFACTURING THE SAME

(75) Inventor: Tsutomu Yamagiwa, Osaka (JP)

(73) Assignee: Panasonic Corporation, Osaka (JP)

( * ) Notice: Subject to any disclaimer, the term of this patent is extended or adjusted under 35 U.S.C. 154(b) by 732 days.

(21) Appl. No.: 12/211,955

(22) Filed: Sep. 17, 2008

(65) Prior Publication Data

US 2009/0079613 A1 Mar. 26, 2009

(30) Foreign Application Priority Data

Sep. 21, 2007 (JP) ................................ 2007-244833
Apr. 9, 2008 (JP) ................................ 2008-101211

(51) Int. Cl.
*H04L 17/02* (2006.01)

(52) U.S. Cl. ....................................................... 341/176

(58) Field of Classification Search .................. 341/176, 341/34

See application file for complete search history.

(56) References Cited

U.S. PATENT DOCUMENTS 6,509,848 B1 * 1/2003 Ogata et al. ..................... 341/34
6,935,956 B1 * 8/2005 Ogata et al. ...................... 463/38
2009/0051580 A1 * 2/2009 Yamagiwa .................... 341/176

FOREIGN PATENT DOCUMENTS

JP 2006-033680 2/2006

* cited by examiner

*Primary Examiner* — Michael Rutland Wallis

(74) *Attorney, Agent, or Firm* — Wenderoth, Lind & Ponack, L.L.P.

(57) ABSTRACT

For a remote controller that is mainly used for simply and surely controlling various electronic devices, when predetermined pressing force is imposed on an operating body, a predetermined set value is stored in a storing section when a detection value of a pressure-sensitive conducting contact exceeds a predetermined resistance value and the detected value is stored in the storing section when the detection value of the contact point is within the range of the predetermined resistance value. Since a remote control signal is generated using a ratio of a value stored in the storing section and a value obtained when the remote controller is operated, an electronic device can be controlled without being influenced by variation of elements constituting the remote controller.

5 Claims, 14 Drawing Sheets

| Pressing force | Resistance value output from pressure-sensitive conducting contact 18 | Resistance value stored on storing section 20 | Digital data calculated by operating section 21 |
|---|---|---|---|
| Pmin | Ra1 | Ra1 | 255 |
| Pcn | Rcn | – | 255×(Rcn–Rb1) / (Ra1–Rb1) |
| Pmax | Rb1 | Rb1 | 0 |

| Pressing force | Resistance value output from pressure-sensitive conducting contact 18 | Resistance value stored on storing section 20 | Digital data calculated by operating section 21 |
|---|---|---|---|
| Pmin | Ra3 | Rk1 | 255 |
| Pc3 | Rc3 | – | 255×(Rc3–Rb3) / (Rk1–Rb3) |
| Pmax | Rb3 | Rb3 | 0 |

| Pressing force | Resistance value output from pressure-sensitive conducting contact 18 | Resistance value stored on storing section 20 | Digital data calculated by oprating section 21 |
|---|---|---|---|
| Pmin | Ra4 | Ra4 | 255 |
| Pc4 | Rc4 | – | 255×(Rc4−Rk2) / (Ra4−Rk2) |
| Pmax | Rb4 | Rk2 | 0 |

FIG. 14

| Pressing force | Resistance value output from pressure-sensitive conducting contact 18 | Resistance value stored on storing section 20 | Digital data calculated by operating section 21 |
|---|---|---|---|
| Pmin | Ra5 | Rk1 | 255 |
| Pc5 | Rc5 | – | 255×(Rc5–Rk2) / (Rk1–Rk2) |
| Pmax | Rb5 | Rk2 | 0 |

FIG. 15

| Pressing force | Resistance value output from pressure-sensitive conducting contact 18 | Resistance value stored on storing section 20 | Digital data calculated by operating section 21 |
|---|---|---|---|
| Pmin | Ra6 | Ra6 | 255 |
| Pc6 | Rc6 | – | 255×(Rc6–Rb6) / (Ra6–Rb6) |
| Pmax | Rb6 | Rb6 | 0 |

REMOTE CONTROLLER, METHOD FOR CONTROLLING THE SAME, AND METHOD FOR MANUFACTURING THE SAME

BACKGROUND OF THE INVENTION

1. Field of the Invention

The present invention relates to a remote controller that is mainly used for remote control of various electronic devices, a method for controlling the same, and a method for manufacturing the same.

2. Background Art

In recent years, various electronic devices with high function such as a television, a video system, or an air conditioner have been developed. Remote controllers for remotely-controlling these electronic devices need signal transmission for surely realizing high function.

A conventional remote controller is described with reference to FIGS. 17 to 19.

FIG. 17 is a sectional view of the conventional remote controller 100. As shown in FIG. 17, a housing consists of cases 1 and 10 obtained by forming insulating resin in the shape of a box. The following components are provided inside remote controller 100 covered with cases 1 and 10.

Operating bodies 2 shaped with insulating resin are respectively inserted into a plurality of apertures 1*a* provided in the upper surface of case 1, such that the operating bodies 2 can be moved up and down. Pressure-sensitive conducting sheet 3 consists of an insulating element such as silicone rubber and conductive particles dispersed inside this element. Wiring patterns are provided on the upper and lower surfaces of wiring board 4. As shown in FIG. 17, plural pairs of fixed contacts 5 that consist of copper, carbon, or the like are provided on the upper surface of wiring board 4. Pressure-sensitive conducting sheet 3 is provided at the upper side of these fixed contacts 5.

Spacer 6 consisting of insulating resin is provided between pressure-sensitive conducting sheet 3 and wiring board 4 so as to surround fixed contacts 5. A pressure-sensitive conducting contact 7 consists of pressure-sensitive conducting sheet 3 and a pair of the fixed contacts 5. Pressure-sensitive conducting sheet 3 and each pair of fixed contacts 5 are positioned to face each other with an interval therebetween.

Transmitting section 8 consists of a light emitting diode and so on. As shown in FIG. 17, transmitting section 8 is provided on the lower surface of wiring board 4. Control section 9 consisting of a microcomputer and so on generates a remote control signal to be sent from transmitting section 8 in accordance with a change of a resistance value detected by pressure-sensitive conducting contact 7. Control section 9 will be described in detail later.

Next, an operation of remote controller 100 will be described.

FIG. 18 shows a characteristic of pressing force P and resistance value R of pressure-sensitive conducting sheet 3, which constitutes pressure-sensitive conducting contact 7.

In FIG. 17, if operating body 2 is pressed, lower end 2*a* of the operating body 2 presses down pressure-sensitive conducting sheet 3. Pressure-sensitive conducting sheet 3, which detects the downward pressing of the operating body 2, comes in contact with fixed contacts 5. At this time, pressure-sensitive conducting contact 7 attains an electrically connected state (A0 point in FIG. 18).

If operating body 2 is further pressed, pressure-sensitive conducting sheet 3 is compressed. When pressure-sensitive conducting sheet 3 is compressed, the number of conductive particles in contact with fixed contacts 5 increases, the conductive particles existing inside the insulating element constituting pressure-sensitive conducting sheet 3. In other words, a contact area between pressure-sensitive conducting sheet 3 and fixed contact points 5 is increased. As a result, as shown in the curved line L0 in the characteristic view of FIG. 18, the detected resistance value R becomes small in accordance with an increase of the pressing force P (from point A0 to point C0 via point B0 in FIG. 18).

By the way, such pressure-sensitive conducting contact 7 may show different characteristics depending on hardness of the insulating element forming pressure-sensitive conducting sheet 3, an amount of conductive particles dispersed inside the insulating element, or a dispersion state. For example, when there is pressure-sensitive conducting contact 7 that has a characteristic expressed by the curved line L1 in FIG. 18, the detected resistance value becomes R21 even if the same pressing force P2 is added to operating body 2 and thus the detected result has deviance (point B0 and point D0 in FIG. 18).

Unexamined Japanese Patent Publication No. 2006-33680 has been known as conventional art relevant to the invention of this application, for example.

Electronic devices 30 are remotely-controlled by means of such remote controller 100. FIG. 19A and FIG. 19B show states displaying program lists on display screens 31 of electronic devices 30 such as a remotely-controlled television. There is described a method for moving cursor 33 or pointer 34 shown on display screen 31 to the upper side of display screen 31 by means of remote controller 100.

First, operating body 2 included in remote controller 100 is pressed. In remote controller 100, control section 9 generates a manipulated signal consisting of pulse waveforms and so on, on the basis of the electrically connected state of pressure-sensitive conducting contact 7 and the characteristic between the pressing force and the resistance value shown in FIG. 18. This manipulated signal is sent from transmitting section 8 to electronic device 30 as an infrared remote control signal. When remote control receiving section 32 provided in electronic device 30 receives the remote control signal, cursor 33 or pointer 34 displayed on display screen 31 moves to the upper side.

When operating body 2 is further pressed, pressure-sensitive conducting contact 7 outputs a resistance value based on the characteristic shown in FIG. 18. In other words, when the pressing force is changed from P1 to P2 and from P2 to P3, the resistance value is changed from R1 to R2 and from R2 to R3. Control section 9 continuously detects the change of these resistance values and sends a remote control signal to electronic device 30 via transmitting section 8. If this resistance value becomes less than or equal to a predetermined value, for example the resistance value becomes less than or equal to R10 by adding the pressing force P2, the moving speed of cursor 33 or pointer 34 becomes fast.

By the way, the characteristic shown by pressure-sensitive conducting contact 7 corresponds to the change of the curved line L1 shown in FIG. 18 owing to variation and so on of the insulating element forming pressure-sensitive conducting sheet 3. In this case, even if the pressing force P2 is added to operating body 2, the detected resistance value does not become less than or equal to R10. Therefore, since control section 9 does not generate a remote control signal for changing the moving speed of cursor 33 or pointer 34, the moving speed of cursor 33 or pointer 34 displayed on display screen 31 does not change. If the pressing force P3 is further added to operating body 2, the detected resistance value finally becomes less than or equal to the resistance value R10. At this time, since control section 9 can generate a remote control signal for changing the moving speed of cursor 33 or pointer 34, the electronic device 30 receives this remote control signal and changes the moving speed of cursor 33 or pointer 34 displayed on display screen 31.

In other words, if the characteristic of pressure-sensitive conducting contact 7 has deviance owing to variation and so on of each element forming pressure-sensitive conducting sheet 3, there is a problem that a desired function is not executed even if predetermined pressing force is added. In particular, if the characteristic of pressure-sensitive conducting contact 7 corresponding to each operating body 2 has deviance when remote controller 100 of a television has many operating bodies 2, there is a problem that handling of each operating body 2 becomes cumbersome and thus it can be easily mishandled because each operating body 2 requires different pressing force.

SUMMARY OF THE INVENTION

A method for controlling a remote controller includes pressing an operating body with a first pressing force to obtain a first value, pressing the operating body with a second pressing force to obtain a second value that is smaller than the first value, pressing the operating body with a third pressing force to obtain a third value between the first value and the second value, calculating a ratio of a difference between the second value and the third value to a difference between the first value and the second value, and sending a manipulated signal according to this calculated ratio.

If this method for controlling is used, even when an element constituting the remote controller, particularly an element constituting the operating body and a pressure-sensitive conducting contact has variation and a resistance value detected by a control section is deviated from a standard value, the control section corrects this deviance and generates a remote control signal. As a result, it becomes possible to prevent occurrence of mishandling.

BRIEF DESCRIPTION OF THE DRAWINGS

FIG. 14 is an explanation diagram showing relation between pressing force and digital data according to the first embodiment of the present invention.

FIG. 15 is an explanation diagram showing relation between pressing force and digital data according to the first embodiment of the present invention.

DETAILED DESCRIPTION OF PREFERRED EMBODIMENTS

Hereinafter, a remote controller according to an embodiment of the present invention will be described with reference to the accompanying drawings.

The same components as those described in the Background of the Invention have the same reference numbers, the contents of which are incorporated herein.

First Embodiment

Figure 1:
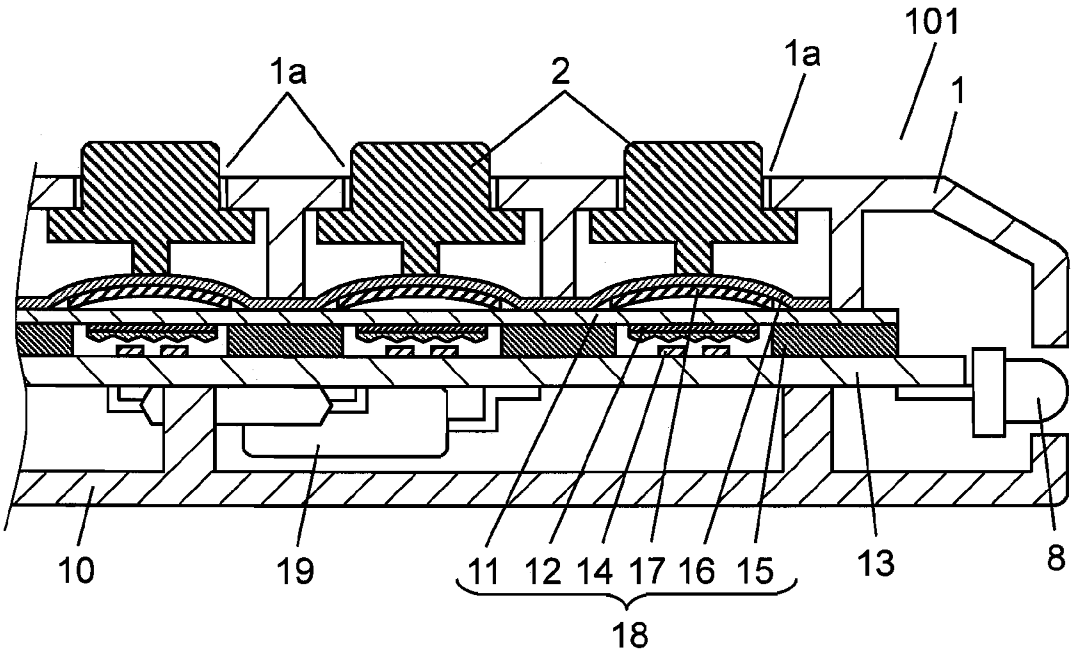
FIG. 1 is a sectional view of a remote controller according to a first embodiment of the present invention.
Figure 2A:
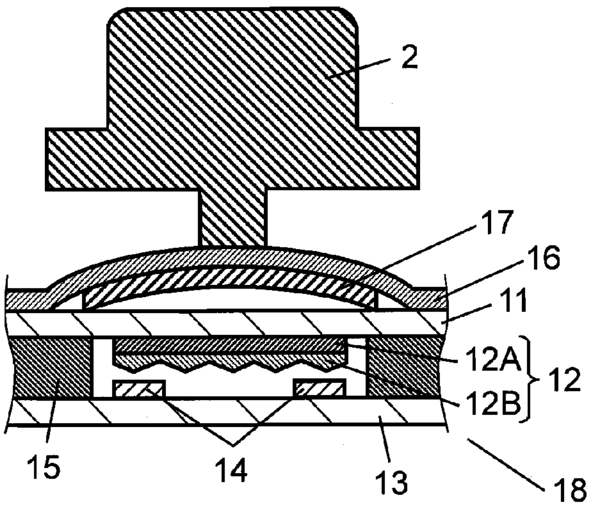
FIG. 2A is a sectional view of a pressure-sensitive conducting contact according to the first embodiment of the present invention.
Figure 2B:
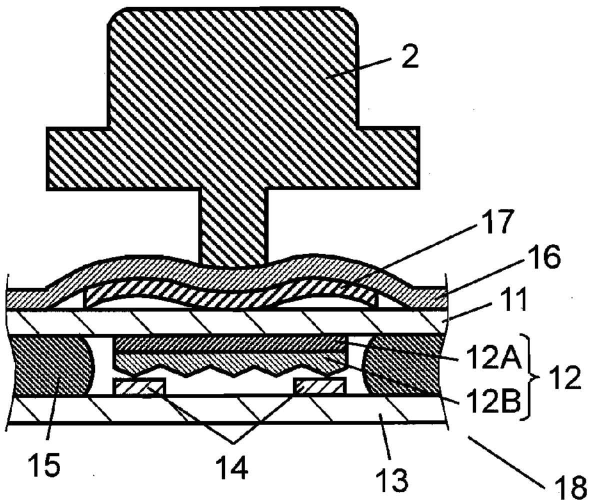
FIG. 2B is a sectional view of the pressure-sensitive conducting contact according to the first embodiment of the present invention.
Figure 2C:
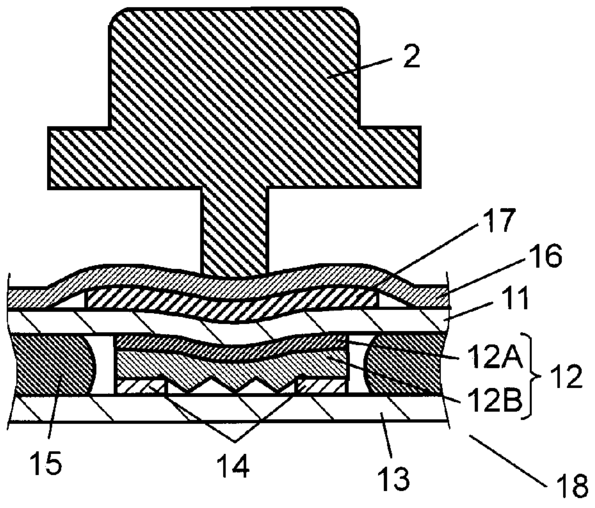
FIG. 2C is a sectional view of the pressure-sensitive conducting contact according to the first embodiment of the present invention.

FIG. 1 shows a sectional view of a remote controller according to a first embodiment of the present invention, and FIGS. 2A to 2C show sectional views of a pressure-sensitive conducting contact according to the first embodiment of the present invention. In the present drawing, a housing has a box shape and consists of cases 1 and 10. Cases 1 and 10 can easily have various shapes if the cases are shaped of insulating resin such as polystyrene or ABS. Operating body 2 can easily have appropriate size and shape if the operating body 2 is shaped of insulating resin such as polystyrene or ABS. A plurality of apertures 1*a* are provided in case 1, and operating bodies 2 are respectively inserted into apertures 1*a* so as to be movable up and down.

Base sheet 11 is a flexible film-shaped sheet of a material such as polyethylene terephthalate, polycarbonate, or polyimide. Low resistor layer 12A and high resistor layer 12B are provided on a lower surface of base sheet 11 in sequence downward from base sheet 11. Pressure-sensitive conducting layer 12 is formed by superimposing low resistor layer 12A and high resistor layer 12B having a resistance value higher than that of low resistor layer 12A over each other. Low resistor layer 12A is formed by dispersing conductive powder inside insulating resin. As a specific example, low resistor layer 12A consists of carbon powder dispersed inside synthetic resin. A resistance value of low resistor layer 12A is in a range of sheet resistance values of 0.5 kΩ/□ to 30 kΩ/□. High resistor layer 12B can be formed by reducing carbon powder dispersed inside synthetic resin or by changing materials of insulating resin or conductive powder. In the first embodiment, high resistor layer 12B has fine uneven surface thereon, and its sheet resistance value is in a range of 50 kΩ/□ to 5 MΩ/□.

Moreover, as shown in FIG. 2A to FIG. 2C, it is preferred that low resistor layer 12A and high resistor layer 12B are superimposed to have characteristics different from each other. Alternatively, low resistor layer 12A and high resistor layer 12B may be used, which have continuously changing resistance values inside pressure-sensitive conducting layer 12 and a resistance value of fixed contact 14 be larger than that of base sheet 11.

Wiring board 13 is a substrate consisting of paper phenol, epoxy containing glass, and so on. A plurality of wiring patterns consisting of copper foil or the like is provided on upper and lower surfaces of wiring board 13. Fixed contacts 14 are provided on the upper surface of wiring board 13. Fixed contacts 14 consist of electrical conductors such as copper, carbon, or gold plating, which are formed in the shape of a fork or hemi cycle, and have at least one pair.

Furthermore, spacer 15 is provided on the upper surface of wiring board 13 so as to surround fixed contacts 14. Base sheet 11 is mounted on an upper surface of spacer 15. Spacer 15 consists of insulating resin such as epoxy or polyester. If spacer 15 is provided between wiring board 13 and base sheet 11, pressure-sensitive conducting layer 12 and fixed contacts 14 may be provided to face each other at intervals around 10 μm to 100 μm. Pressure-sensitive conducting layer 12 is provided on the lower surface side (wiring board 13 side in FIG. 2A) of base sheet 11.

Cover sheet 16 is a film-shaped sheet having flexibility similar to base sheet 11. Movable contact 17 is an element that has a curved surface shape and consists of sheet metal having electrical conductivity such as steel or copper alloy. Movable contact 17 is attached to a lower surface of cover sheet 16 by means of adhesive such as acryl and silicon.

As shown in FIG. 2A, pressure-sensitive conducting contact 18 that forms a contact section has the following configuration. A pair of fixed contacts 14 is provided on wiring board 13 at a position surrounded by spacer 15. Base sheet 11, in which pressure-sensitive conducting layer 12 is formed on the lower surface side of base sheet 11, is provided at an upper side of the one pair of fixed contacts 14. Cover sheet 16 is provided at the upper surface side of base sheet 11 via movable contact 17. Operating body 2 is provided on an upper portion of cover sheet 16 so as to be movable up and down.

Remote controller 101 includes therein a plurality of pressure-sensitive conducting contacts 18. If operating body 2 is pressed, pressure-sensitive conducting contact 18 pushes downward cover sheet 16 and movable contact 17 provided at a lower end of operating body 2. Movable contact 17 performs the reversing operation with click feeling. A lower surface of movable contact 17 presses base sheet 11. Pressure-sensitive conducting layer 12 comes in contact with fixed contact 14 when base sheet 11 is bent. As a result, the one pair of fixed contacts 14 comes in contact, so that an electrically-connected state is formed.

Control section 19 and transmitting section 8 are provided on wiring board 13. Control section 19 includes a microcomputer and transmitting section 8 sends remote control signals generated from control section 19 to electronic device 30. Control section 19 detects whether pressure-sensitive conducting contact 18 is electrically connected or not, or detects a resistance value that is changed in accordance with a contact area between pressure-sensitive conducting layer 12 and fixed contacts 14. Control section 19 generates remote control signals in accordance with a state of pressure-sensitive conducting contact 18 being changed. Control section 19 includes at least storing section 20, operating section 21 and processing section 22 in FIG. 5.

Pressure-sensitive conducting contact 18, control section 19, transmitting section 8, the other electronic components, and a battery that becomes a power source are connected through a wiring pattern provided in wiring board 13.

Remote controller 101 is formed by putting these elements inside cases 1 and 10.

Next, a method for manufacturing the remote controller 101 shown in the first embodiment of the present invention will be described using FIGS. 2A to 2C and FIGS. 3 to 5.

Figure 3:
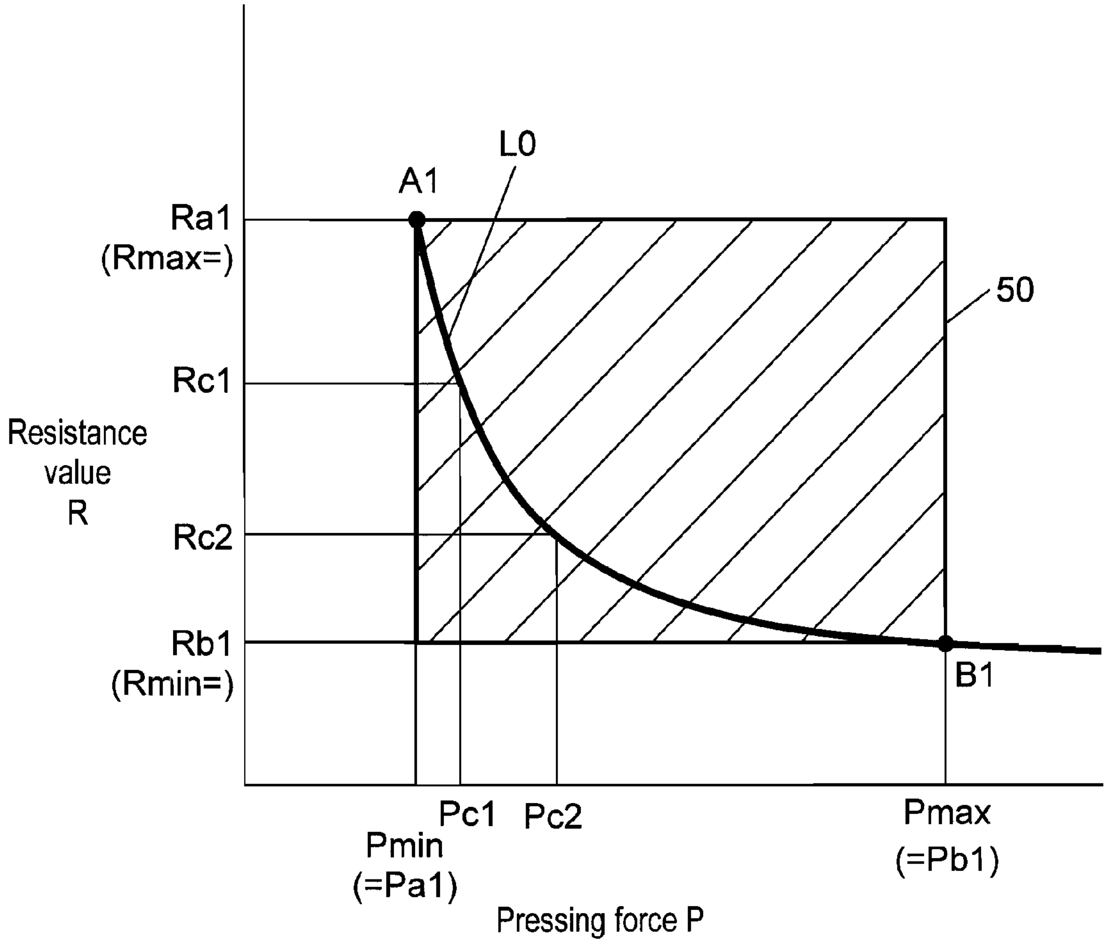
FIG. 3 is a characteristic view showing relation between pressing force and a resistance value related to the remote controller using elements having a standard characteristic according to the first embodiment of the present invention.
Figure 4:
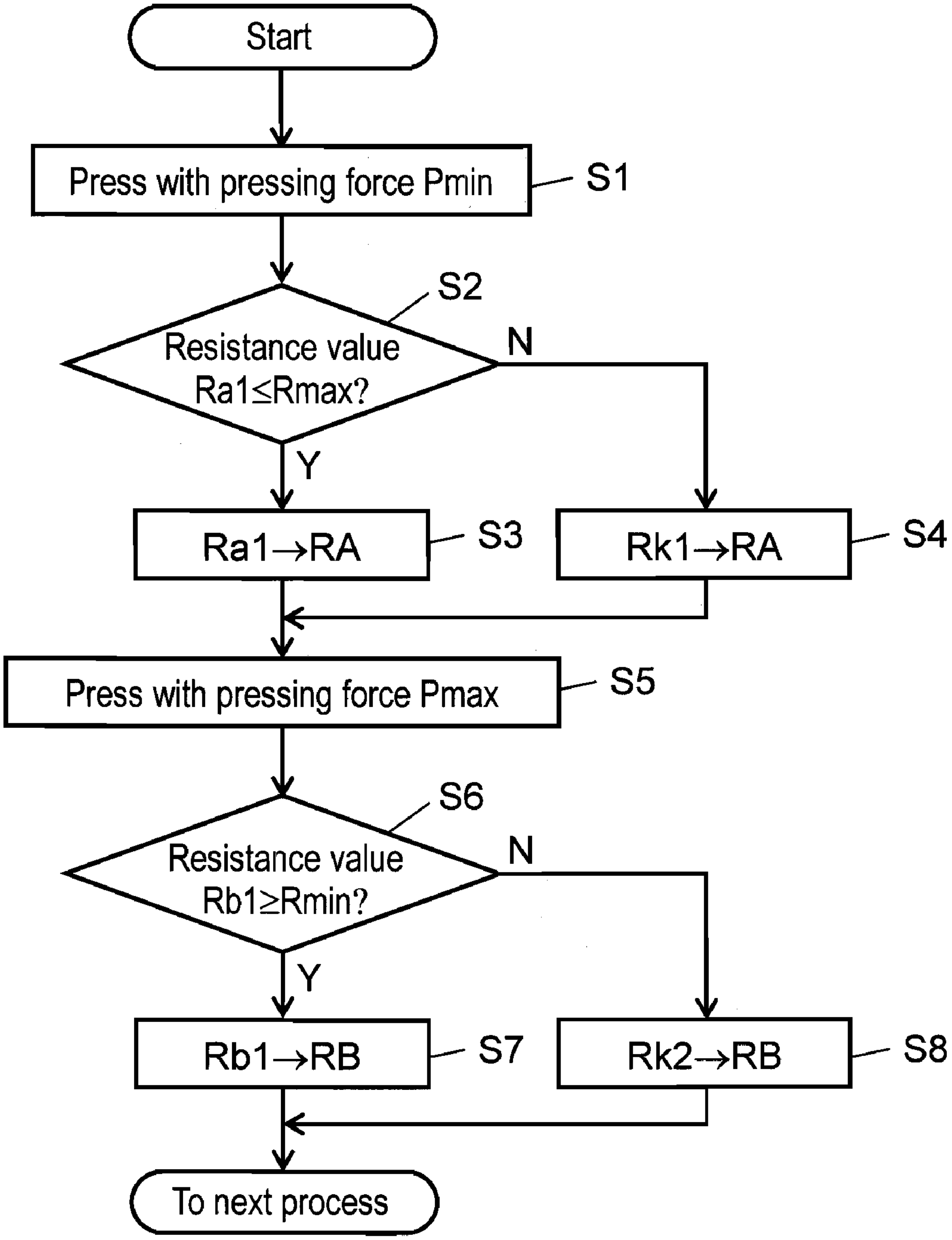
FIG. 4 is a flowchart explaining a substantial part of a process for manufacturing the remote controller according to the first embodiment of the present invention.
Figures 5, 6:
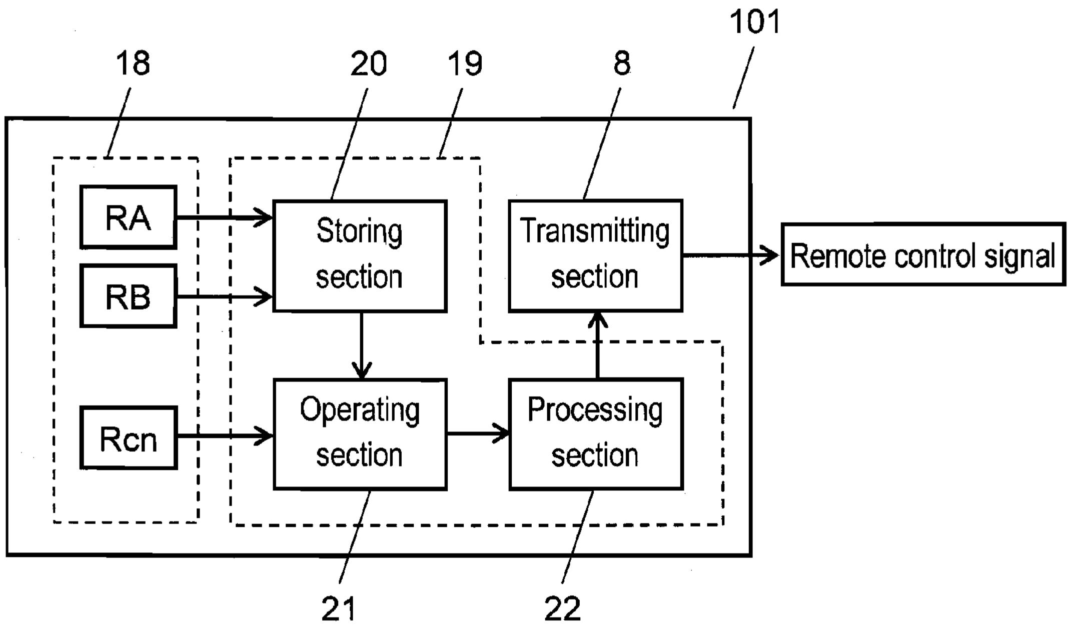
FIG. 5 is a block diagram showing the remote controller according to the first embodiment of the present invention.
FIG. 6 is an explanation diagram showing relation between pressing force and digital data according to the first embodiment of the present invention.

FIG. 3 is a characteristic view showing relation between pressing force and a resistance value related to the remote controller using elements having a standard characteristic in the first embodiment of the present invention. FIG. 4 is a flowchart explaining a substantial part of a process for manufacturing the remote controller in the first embodiment of the present invention. FIG. 5 is a block diagram showing the remote controller in the first embodiment of the present invention.

After the above-described remote controller 101 has been assembled, control section 19 stores a resistance value corresponding to predetermined pressing force that is detected by each pressure-sensitive conducting contact 18 provided in remote controller 101, through the following processes. Pressure-sensitive conducting contacts 18 have different relations between the pressing force and the resistance value even if the contact points are in one remote controller 101.

First, operating body 2 constituting pressure-sensitive conducting contact 18 is pressed at predetermined pressing force Pmin (S1). A value of the pressing force Pmin is set in accordance with the next thought. In other words, an element constituting pressure-sensitive conducting contact 18 has variation. However, when each element has a standard characteristic, the minimum pressing force is set as Pmin, in which the pressing force is the minimum force required to arrive at a state as shown in FIG. 2B, that is, an electrically-connected state made by contacting pressure-sensitive conducting layer 12 and fixed contacts 14.

At this time, it is decided whether or not a resistance value Ra1 output from pressure-sensitive conducting contact 18 to control section 19 is in a range capable of being detected by control section 19 (S2). If the resistance value Ra1 detected by control section 19 is in the range (not over Rmax) capable of being detected by control section 19 (Y in S2), the detected resistance value Ra1 is stored as a resistance value RA (a first value) of a state A (A point in FIG. 3) (S3).

On the other hand, for example, RA is set to a predetermined constant Rk1 (a first set value) when pressure-sensitive conducting layer 12 and fixed contacts 14 do not arrive at a contact state due to variation between elements constituting pressure-sensitive conducting contact 18 in case of pressing force Pmin or when resistance values of pressure-sensitive conducting layer 12 and fixed contacts 14 exceed the range capable of being detected by control section 19 (N in S2) (S4).

Next, operating body 2 is pressed at predetermined pressing force Pmax similarly to the process (S5). A value of the pressing force Pmax is set in accordance with the next thought. In other words, when elements constituting pressure-sensitive conducting contact 18 have a standard characteristic similarly to the case of the pressing force Pmin, pressure-sensitive conducting contact 18 arrives at a state as shown in FIG. 2C, that is, a state where operating body 2 is sufficiently pushed and thus a contact area between pressure-sensitive conducting layer 12 and fixed contacts 14 increases, thereby sufficiently reducing a resistance value detected by control section 19. Specifically, as is apparent from a characteristic view shown in FIG. 3, since a changed portion of a resistance value relative to a changed portion of pressing force becomes small if the pressing force becomes large, predetermined pressing force is set to Pmax which is the maximum pressing force in consideration of performance or the like of in-use control section 19.

At this time, it is decided whether a resistance value Rb1 output from pressure-sensitive conducting contact 18 to control section 19 is in the range (above Rmin) capable of being detected by control section 19 with high precision (S6). If the resistance value Rb1 detected by control section 19 is larger than a predetermined value (Y in S6), the detected resistance value Rb1 is stored as a resistance value RB (a second value) of a state B (referred to as B in FIG. 3) (S7).

On the other hand, when the pressing force Pmax is added by variation of elements constituting pressure-sensitive conducting contact 18, a resistance value Rk2 (a second predetermined value) is stored as the resistance value RB if the resistance value detected by control section 19 is smaller than a predetermined value (N in S6) (S8).

In this way, as a result of adding the predetermined pressing forces Pmin and Pmax to operating body 2, storing section 20 stores the resistance values RA and RB that are used by control section 19 for calculation in FIG. 5. Then, it advances to the following step.

Here, a step of storing the resistance values RA and RB may be performed during a step of assembling remote controller 101.

Operations of remote controller 101 manufactured through the above-described processes will be described with reference to FIGS. 3 to 16.

First, it will be described with reference to FIG. 3 the case in which remote controller 101, particularly pressure-sensitive conducting contact 18 is formed of elements having a standard characteristic.

FIG. 3 is a characteristic view whose horizontal axis shows pressing force P of operating body 2 and whose vertical axis shows a resistance value R detected by control section 19 via pressure-sensitive conducting contact 18. In the present drawing, control range 50 enclosed by a frame is a range performing control in the first embodiment of the present invention.

In other words, the pressing force Pmin showing one end of control range 50 is a first pressing force by which the resistance value RA (the first value) is evolved in the above-described manufacturing process. When the pressing force is located more to the left side than the pressing force Pmin, that is to say, the pressing force adding to operating body 2 is smaller than the pressing force Pmin, control section 19 does not generate a remote control signal.

The pressing force Pmax showing the other end of control range 50 is a second pressing force by which the resistance value RB (the second value) is similarly evolved in the manufacturing process. Although the pressing force is located more to the right side than the pressing force Pmax, that is to say, the pressing force adding to operating body 2 is larger than the pressing force Pmax, control section 19 does not generate a new remote control signal because a changing resistance value cannot be detected with high precision.

A procedure to generate digital data will be described when constituting remote controller 101 by means of elements having a standard characteristic.

Operating section 21 shown in FIG. 5 computes digital data from the resistance values RA=Ra1 and RB=Rb1 that are analog data detected in the manufacturing process and a resistance value Rcn detected between the resistance values Ra1 and Rb1. Expression computing digital data is the following.

$$Dn=K\times(Rcn-RB)/(RA-RB)$$

In the above Expression, Dn is digital data, K is resolution of digital data of control section 19, Rcn is a resistance value detected by control section 19 by pressing operating body 2, and RA and RB are the first and second values stored on storing section 20 in the manufacturing process. Moreover, RA and RB become first and second set values depending on resistance values detected by control section 19.

Moreover, K can have $2^n$ resolution when using an n-bit microcomputer. In the present embodiment, the case of using a microcomputer having 8-bit and 256-stage resolution will be described as an example.

Figure 7:
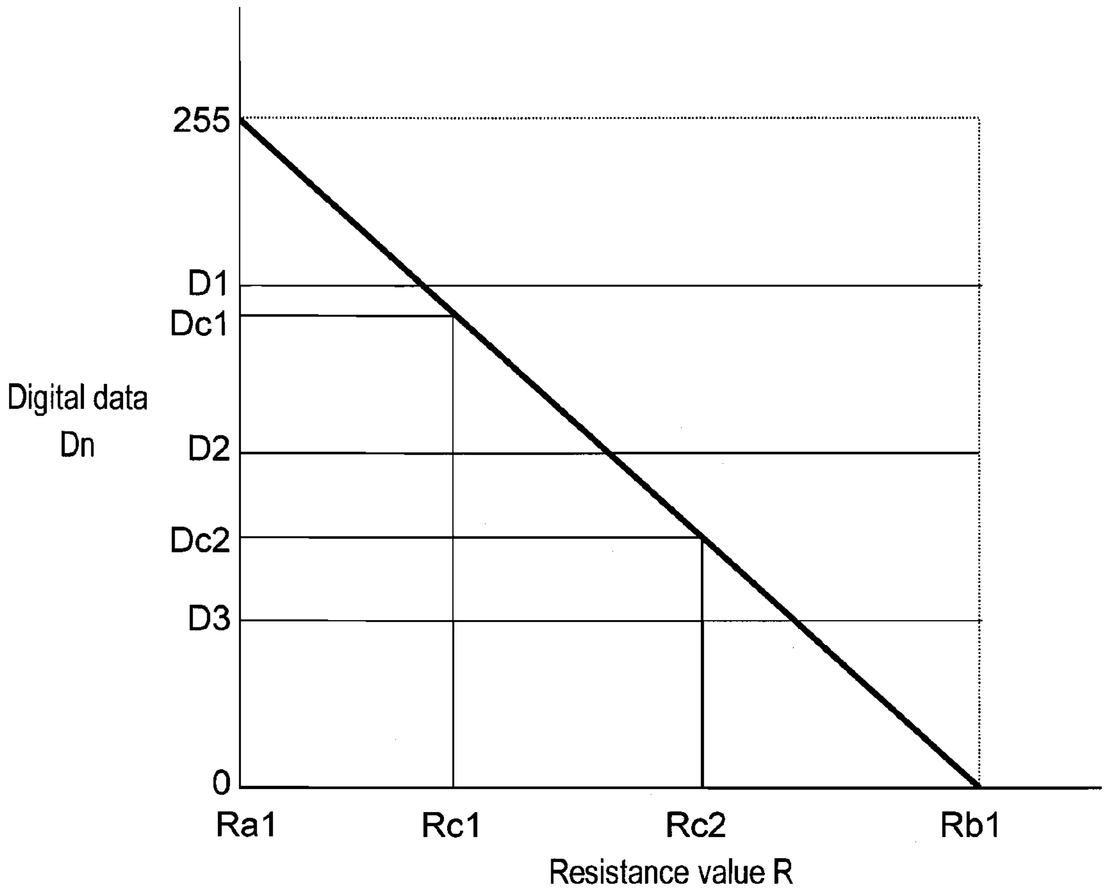
FIG. 7 is a graph showing relation between a resistance value and digital data according to the first embodiment of the present invention.

This result is shown in FIGS. 6 and 7. FIG. 6 shows relation between the resistance values (RA and RB) stored on storing section 20 and an expression for computation of digital data using these resistance values, when the predetermined pressing forces Pmin and Pmax are added to operating body 2. FIG. 7 is a view whose horizontal axis shows a resistance value R of analog data and whose vertical axis shows digital data Dn corresponding to the resistance value. As is apparent from these drawings, when operating body 2 is pressed within the range of the pressing forces Pmin to Pmax, control section 19 detects a resistance value in the range of Ra1 to Rb1 and changes the corresponding digital data in the range of 255 to 0.

Furthermore, from relation of control signals, the corresponding digital data may be changed in the range of 0 to 255 by converting the digital data in an inverse number converting method.

Electronic devices 30 are remotely controlled by means of the digital data generated in this way. Hereinafter, its operation will be explained using FIG. 3, FIG. 5, FIG. 8A, and FIG. 8B.

Figure 8A:
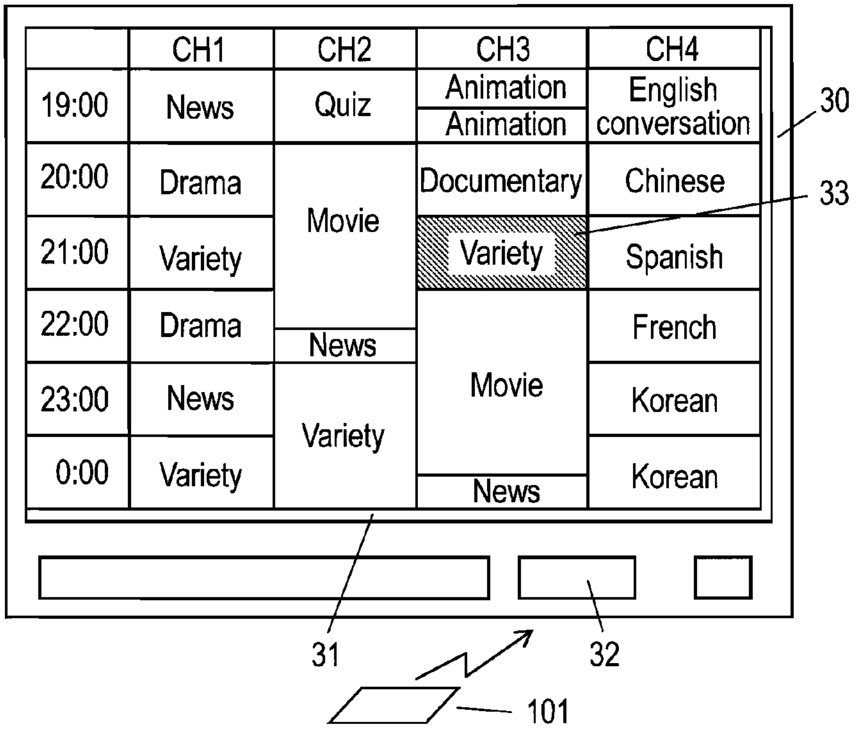
FIG. 8A is an explanation diagram explaining an operation of a remotely-controlled electronic device according to the first embodiment of the present invention.
Figure 8B:
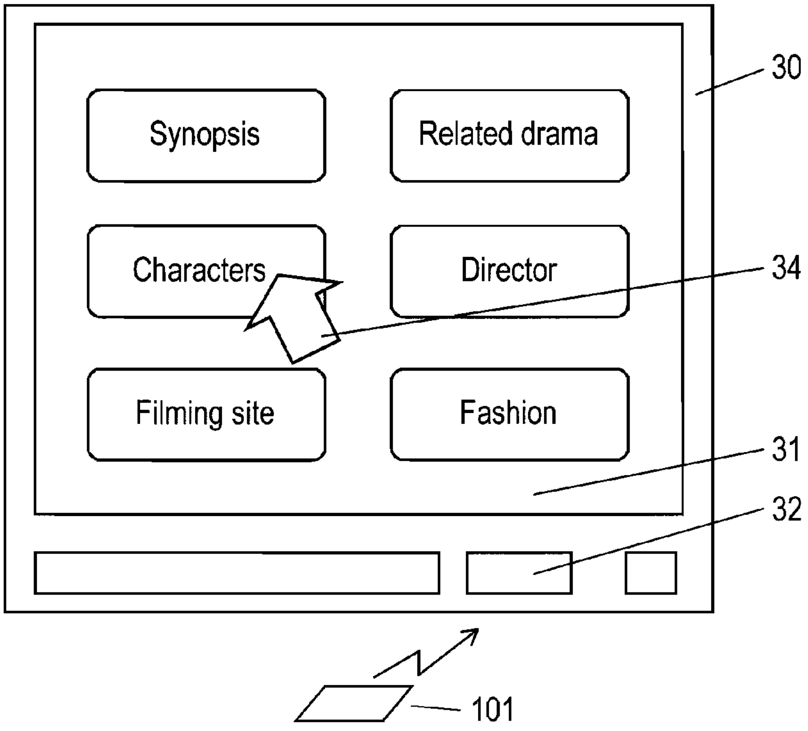
FIG. 8B is an explanation diagram explaining an operation of the remotely-controlled electronic device according to the first embodiment of the present invention.

FIG. 8A shows a program list on display screen 31 of a television as an example of electronic device 30 that is remotely controlled. Similarly, FIG. 8B shows a menu such as program introduction on display screen 31. In such a state, a user holds remote controller 101 toward remote control receiving section 32 and presses predetermined operating body 2 with a finger.

When the pressing force of operating body 2 reaches Pmin by reverse of movable contact 17 (a state of A1 in FIG. 2B and FIG. 3), pressure-sensitive conducting layer 12 comes in contact with fixed contacts 14, so that a pair of fixed contacts 14 are electrically connected. In other words, control section 19 detects that pressure-sensitive conducting contact 18 is electrically connected. Control section 19 calculates digital data from the resistance value Ra1 obtained by operating section 21. Processing section 22 generates a remote control signal consisting of pulse waveforms in order to control electronic device 30. The remote control signal generated in this way is sent from transmitting section 8 to remote control receiving section 32 provided in electronic device 30. Electronic device 30 moves, for example, cursor 33 and pointer 34 displayed on display screen 31 to the upper side of the screen based on the received remote control signal.

After that, when the pressing force reaches Pc1 by further strongly pressing operating body 2, a contact area between pressure-sensitive conducting layer 12 and fixed contacts 14 increases. At this time, as shown by a curved line L0 in FIG. 3, a resistance value to be detected becomes Rc1. The resistance value Rc1 is converted into digital data Dc1 in operating section 21. The digital data Dc1 is smaller than a threshold value D1 by which a moving speed of cursor 33 and pointer 34 displayed on display screen 31 shown in FIGS. 8A and 8B is switched to double speed. Processing section 22 generates a remote control signal by which a moving speed of cursor 33 and pointer 34 becomes double speed. This remote control signal is sent from transmitting section 8 to remote control receiving section 32. As a result, a speed by which cursor 33 and pointer 34 move upward in electronic device 30 becomes double speed.

Furthermore, when the pressing force reaches Pc2 by strongly pressing operating body 2, the contact area between pressure-sensitive conducting layer 12 and fixed contacts 14 further increases. As a result, a resistance value detected by control section 19 becomes Rc2 along the curved line L0 shown in FIG. 3. The resistance value Rc2 is converted into digital data Dc2 in operating section 21. The digital data Dc2 is smaller than a threshold value D2 by which a moving speed of cursor 33 and pointer 34 displayed on display screen 31 shown in FIGS. 8A and 8B is switched to four times speed. Processing section 22 generates a remote control signal by which a moving speed of cursor 33 and pointer 34 becomes four times speed. The remote control signal generated in this way is sent from transmitting section 8 to electronic device 30 via remote control receiving section 32. As a result, a speed by which cursor 33 and pointer 34 move to the upper side of display screen 31 becomes four times speed.

When the pressing force reaches Pmax by further strongly pressing operating body 2, digital data becomes zero, and becomes smaller than a threshold value D3 by which a moving speed of cursor 33 and pointer 34 displayed on display screen 31 shown in FIGS. 8A and 8B is switched to eight times speed. Processing section 22 generates a remote control signal based on the digital data of zero. As a result of receiving the remote control signal, a speed by which cursor 33 and pointer 34 move to the upper side of display screen 31 becomes eight times speed. In addition, since the resistance value R detected by control section 19 is not changed even if operating body 2 is further strongly pressed, the moving speed of cursor 33 and pointer 34 still becomes eight times speed.

As above, although an operation of operating body 2 that moves cursor 33 and pointer 34 to the upper side of display screen 31 has been described, the other operating bodies 2 can have the same action and effect in connection with a function of each operating body 2. Specifically, cursor 33 or pointer 34 displayed on display screen 31 can move to a lower side or in a horizontal direction, or can change the size of a voice output.

In the meantime, in a real manufacturing process, it is difficult for a plurality of pressure-sensitive conducting contacts 18 having characteristics of the curved line L0 used in the above description to be provided in one remote controller 101. Conventionally, product design has been performed in consideration of variation of elements. However, when characteristics of elements have large variation like remote controller 101 according to the first embodiment of the present invention, a solution by combining elements has a limit.

As described above, low resistor layer 12A that is a principal element of pressure-sensitive conducting contact 18 forms pressure-sensitive conducting layer 12, and is made by dispersing carbon powder inside synthetic resin. As a result, a sheet resistance value of low resistor layer 12A is in the range of 0.5 kΩ/□ to 30 kΩ/□. Similarly, high resistor layer 12B has fine unevenness provided on its surface. As a result, a sheet resistance value of high resistor layer 12B is in the range of 50 kΩ/□ to 5 MΩ/□.

Moreover, with the improvement in the function of electronic device 30, a function of electronic device 30 cannot be sufficiently utilized by the resistance value supplied by pressure-sensitive conducting contact 18 to control section 19, with precision by which the transmitter can correspond to only one threshold value necessary to perform a simple on/off decision.

Therefore, remote controller 101 as described in the first embodiment of the present invention can sufficiently perform remotely-control functions of electronic device 30 with high function by performing control corresponding to variation of characteristics of elements while making use of characteristics of elements constituting pressure-sensitive conducting contact 18. Hereinafter, it will be described by means of a specific example.

Figure 9:
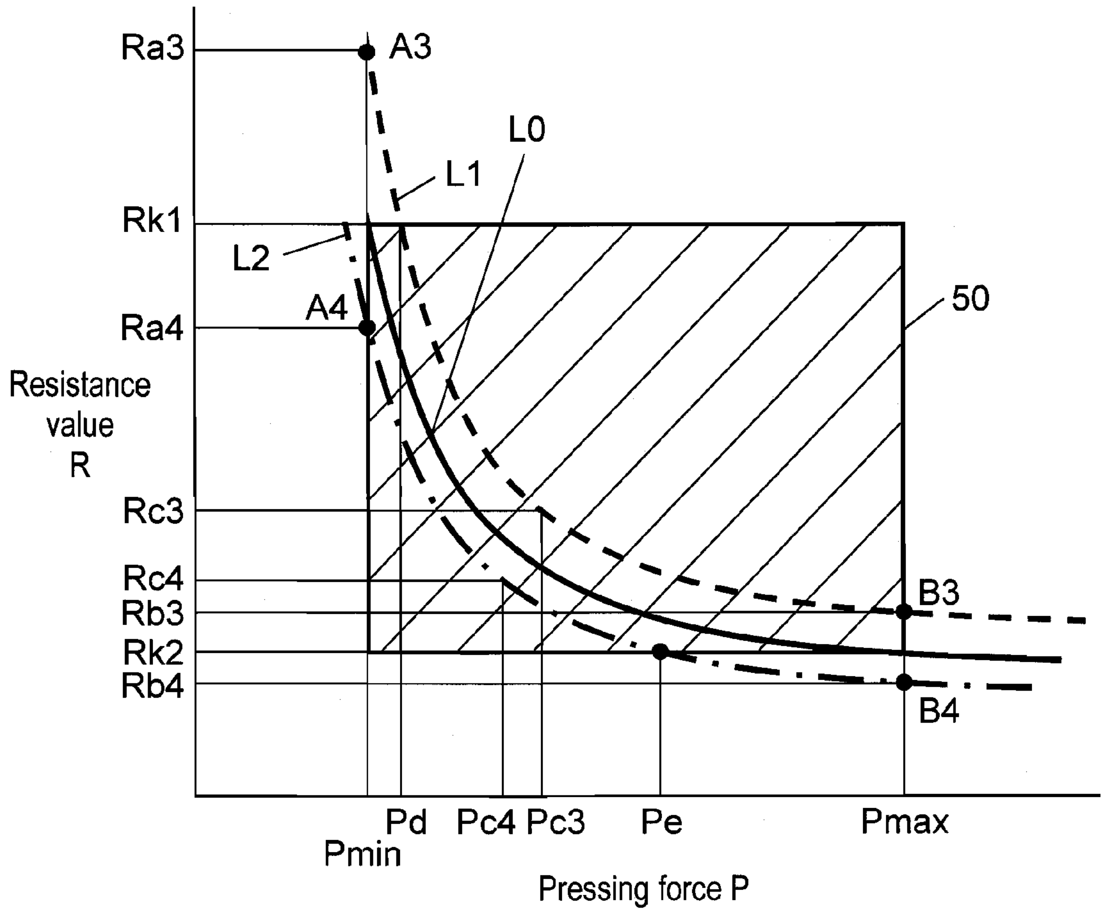
FIG. 9 is a characteristic view showing relation between pressing force and a resistance value related to the remote controller according to the first embodiment of the present invention.

The case of using pressure-sensitive conducting contact 18 along a curved line L1 that has a characteristic having resistance values highly detected on the whole compared to the curved line L0, will be described with reference to FIG. 9.

When the pressing force Pmin is added to operating body 2 in the manufacturing process, a resistance value detected by pressure-sensitive conducting contact 18 becomes Ra3. However, since this resistance value exceeds the range detectable by control section 19, Rk1 that is the first set value is stored on storing section 20 as the resistance value corresponding to the pressing force Pmin.

A resistance value detected by control section 19 becomes Rb3 when the pressing force Pmax is added to operating body 2. Since this resistance value is in the range detectable by control section 19, storing section 20 stores Rb3 as a resistance value corresponding to the pressing force Pmax. Although pressure-sensitive conducting contact 18 along such curved line L1 is used, the next correction is performed so that digital data of from 255 to 0 can be obtained in accordance with the pressing force added to operating body 2.

In other words, it is assumed that the resistance value Rk1 is obtained regardless of the pressing force between the pressing forces Pmin and Pd. Subsequently, digital data are computed by means of the resistance value Rc3 according to the pressing force Pc3 between the pressing forces Pd and Pmax. An operation result using the above-described correction is shown in FIGS. 10 and 11.

Figures 10, 11:
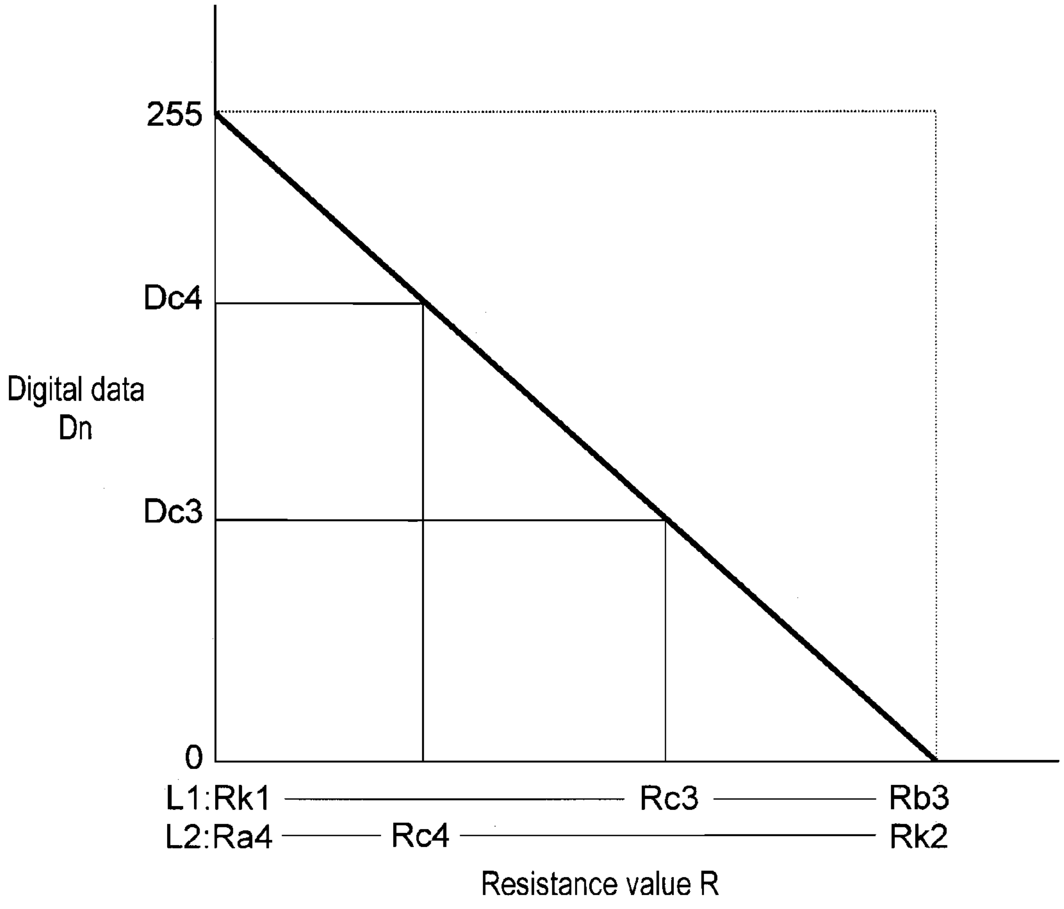
FIG. 10 is an explanation diagram showing relation between pressing force and digital data according to the first embodiment of the present invention.
FIG. 11 is a graph showing relation between a resistance value and digital data according to the first embodiment of the present invention.

When adding the predetermined pressing forces Pmin and Pmax to operating body 2, FIG. 10 shows relation between the resistance values (RA and RB) stored on storing section 20 and a computation expression of digital data using the resistance values. Operating section 21 calculates digital data. Based on this operation result, processing section 22 generates a remote control signal for controlling electronic device 30. The generated remote control signal is sent to remote control receiving section 32 via transmitting section 8.

Next, the case of using pressure-sensitive conducting contact 18 which is a long a curved line L2 and characterized by detecting resistance values low on the whole compared to the curved line L0, will be described with reference to FIG. 9.

When the pressing force Pmin is added to operating body 2 in the manufacturing process, pressure-sensitive conducting contact 18 detects a resistance value Ra4. Since this resistance value is in the range detectable by control section 19, storing section 20 stores Ra4 as the resistance value corresponding to the pressing force Pmin.

A resistance value detected by pressure-sensitive conducting contact 18 becomes Rb4 when adding the pressing force Pmax to operating body 2. Since this resistance value is in the range not detectable by control section 19, storing section 20 stores Rk2 as a resistance value corresponding to the pressing force Pmax. By the way, as is apparent from FIG. 9, the resistance value Rk2 is a value that is detected after adding the pressing force Pe.

In other words, in the case of using pressure-sensitive conducting contact 18 along the curved line L2, the range in which a resistance value is really changed is from Ra4 to Rk2 between the pressing forces Pmin and Pe. Although pressure-sensitive conducting contact 18 having such a characteristic is used, the above correction is performed as if a resistance value is changed in response to the range from the pressing force Pmin to the pressing force Pmax.

Figures 12, 13:
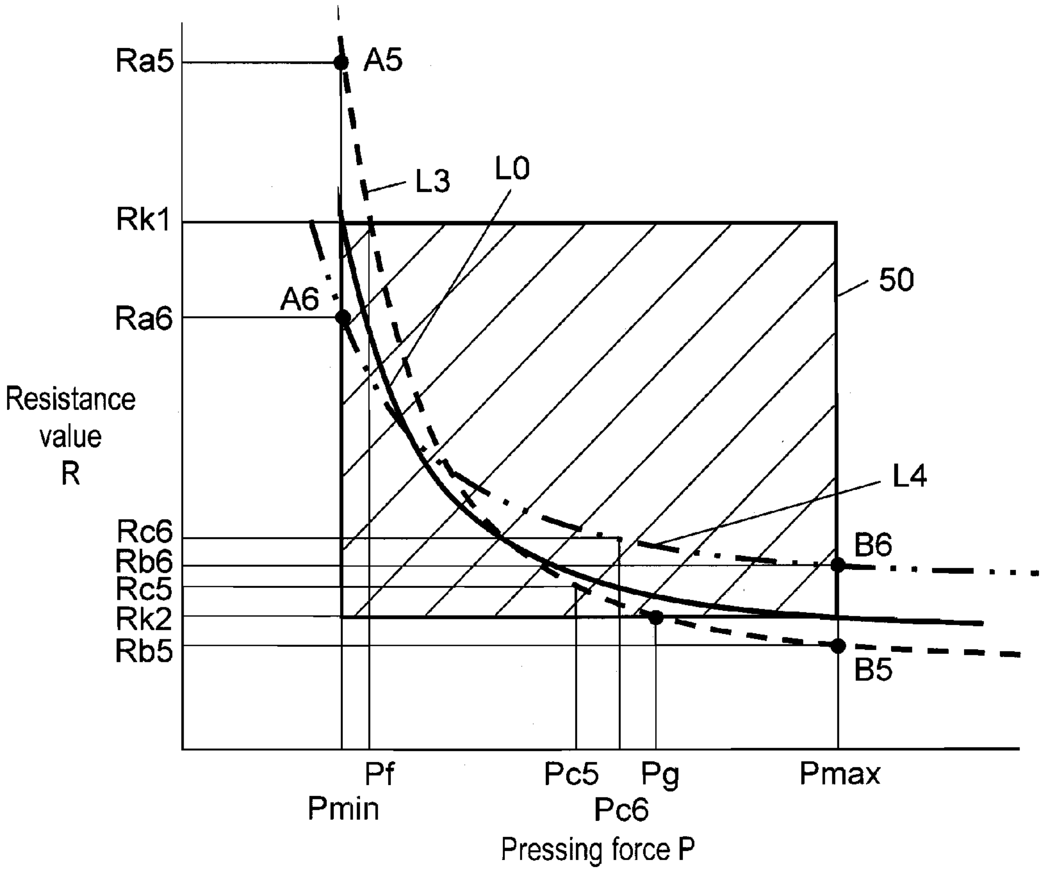
FIG. 12 is an explanation diagram showing relation between pressing force and digital data according to the first embodiment of the present invention.
FIG. 13 is a characteristic view showing relation between pressing force and a resistance value related to the remote controller according to the first embodiment of the present invention.

In other words, a result shown in FIGS. 11 and 12 is made when the pressing force Pc4 between the pressing forces Pmin and Pmax is added to operating body 2.

FIG. 12 shows, when adding the predetermined pressing forces Pmin and Pmax to operating body 2, relation between the resistance values (RA and RB) stored on storing section 20 and a computation expression of digital data using the resistance values. Based on digital data calculated by operating section 21, processing section 22 generates a remote control signal for controlling electronic device 30, and the generated remote control signal is sent to remote control receiving section 32 via transmitting section 8.

Figure 16:
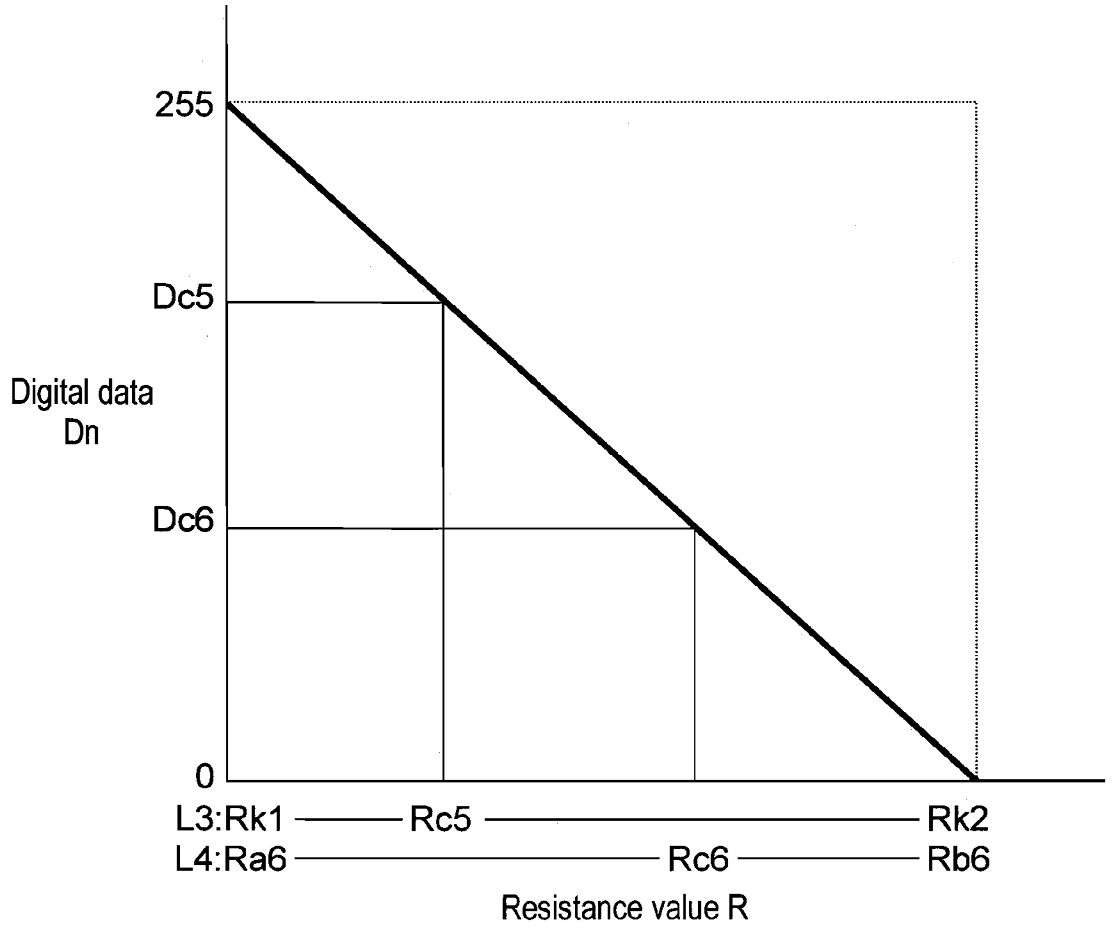
FIG. 16 is a graph showing relation between a resistance value and digital data according to the first embodiment of the present invention.
Figure 17:
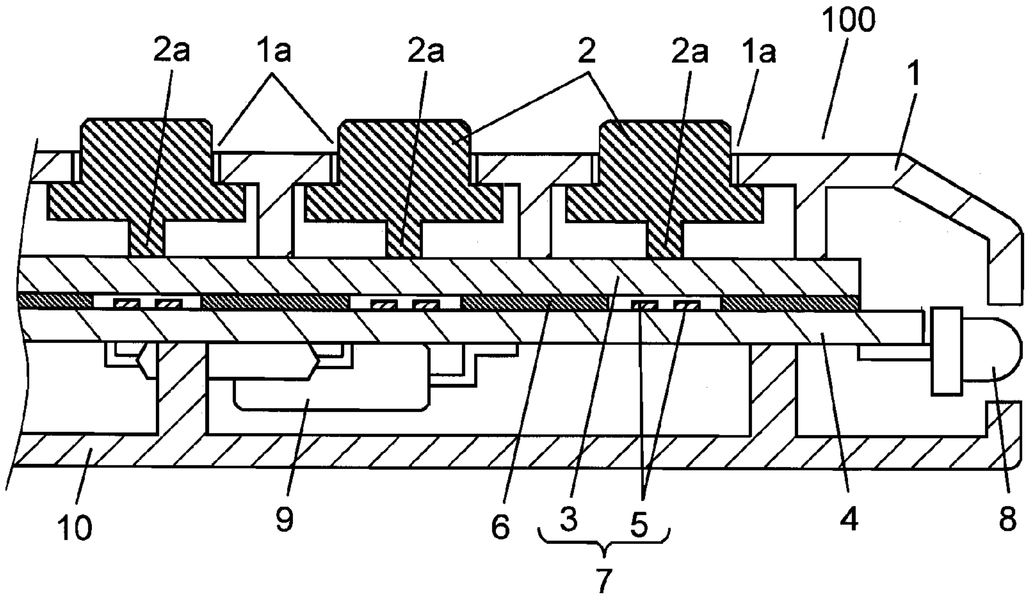
FIG. 17 is a sectional view of a conventional remote controller.
Figure 18:
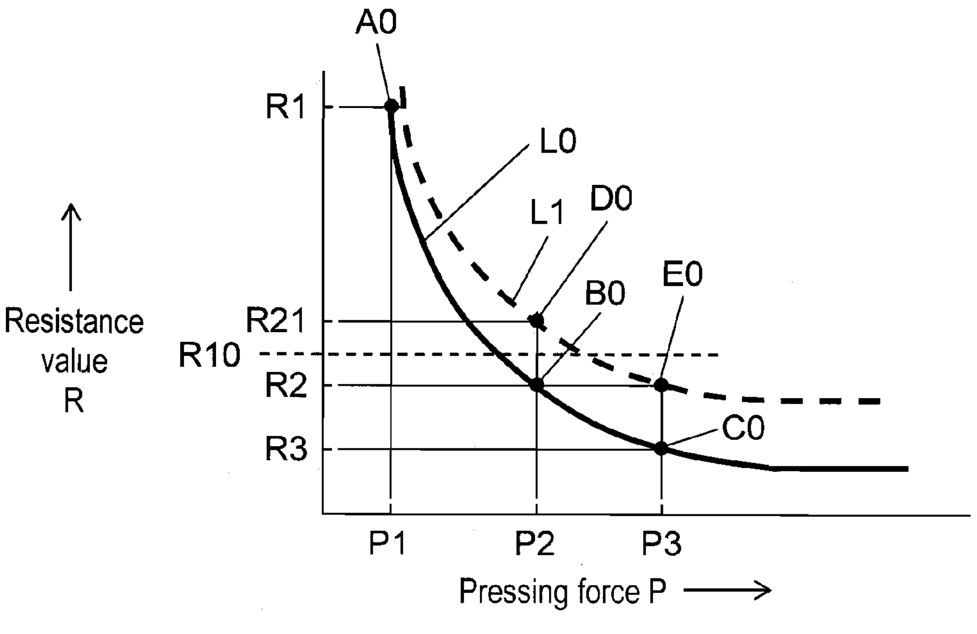
FIG. 18 is a characteristic view showing a conventional characteristic between pressing force and resistance value.
Figure 19A:
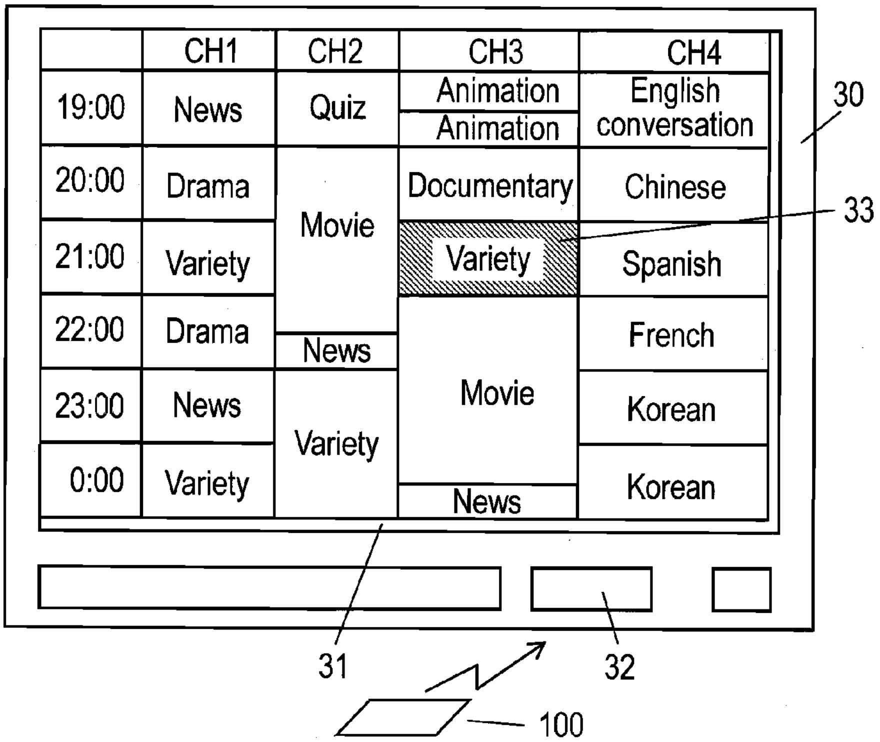
FIG. 19A is an explanation diagram explaining an operation of a remotely-controlled conventional electronic device.
Figure 19B:
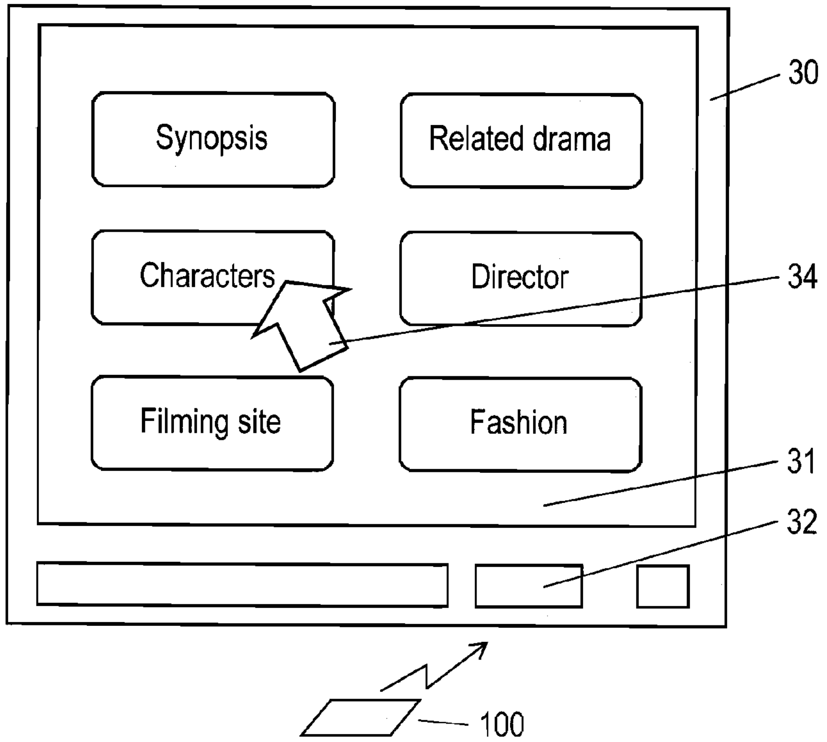
FIG. 19B is an explanation diagram explaining an operation of the remotely-controlled conventional electronic device.

Similarly, results shown in FIGS. 14 to 16 are made when characteristics shown as curved lines L3 and L4 in FIG. 13 are provided.

As is apparent from the above-mentioned description, remote controller 101 according to the first embodiment of the present invention stores the resistance values RA and RB on storing section 20 based on a result detected by pressure-sensitive conducting contact 18 when adding the minimum and maximum pressing forces Pmin and Pmax which are prescribed as control range 50 to operating body 2 in the manufacturing process. When remote controller 101 is used, digital data are computed by means of the stored resistance values RA and RB. When predetermined pressing force Pcn is added to operating body 2 within the range from the minimum pressing force Pmin to the maximum pressing force Pmax, digital data corresponding to the predetermined pressing force is computed by means of the next corrected expression.

$$Dn=K\times(Rcn-RB)/(RA-RB)$$

In the above expression, Dn is digital data, K is resolution of digital data of control section 19, Rcn is a resistance value detected by control section 19 by pressing operating body 2, and RA and RB are the first and second values stored on storing section 20 in the manufacturing process. RA and RB use the first and second set values depending on a resistance value detected by control section 19.

The remote control signal for controlling electronic device 30 is generated by means of this computation result.

If such a correction is performed, the remote controller 101 may be controlled with each resolution required by each function of remote controller 101 within the range from the minimum pressing force Pmin to the maximum pressing force Pmax. Although a microcomputer having 8-bit and 256-stage resolution has been described in the above description, this resolution results from a resolution of analog-to-digital conversion of control section 19. Therefore, it is necessary that analog-to-digital conversion performance is selected in accordance with resolution required by each function of remote controller 101 when designing a hardware.

The range of a resistance value, detectable by control section 19 is based on performance acting as hardware of control section 19. If a circuit for detecting this resistance value is optimally designed, setting according to a purpose of each function becomes possible.

In the above description, a method for adding the maximum and minimum pressing forces to each operating body 2 and storing inherent minimum and maximum resistance values detected by pressure-sensitive conducting contact 18 when manufacturing remote controller 101 has been described. However, variation of the maximum and minimum resistance values detected by each pressure-sensitive conducting contact 18 may be in the range (in the first embodiment, as small as about 10 kΩ to about 20 kΩ) that is permitted for a target. In this case, it may be a method for testing and storing only the maximum resistance value detected by adding the minimum pressing force and storing a predetermined resistance value that is previously set without adding the maximum pressing force. When using this method, a test process can be simplified and storage of control section 19 can be reduced.

Furthermore, a difference between the maximum resistance value Ran and the minimum resistance value Rbn detected by adding the minimum pressing force and the maximum pressing force to pressure-sensitive conducting contact 18 may not have a width sufficient to realize a purpose (in the first embodiment, as small as about several kΩ to several 10 kΩ). In such a case, since a change sufficient to realize a purpose of each function cannot be obtained, this remote controller can be excluded as a defective product in a test process. In this manner, when using the embodiment of the present invention, the setting of the remote controller can be performed and the selection of pass and fail can be also performed.

As is apparent from the above-mentioned description, according to the present embodiment, it is possible to obtain the next action and effect.

In a process for manufacturing remote controller 101, the first pressing force and the second pressing force are added to operating body 2 and the first and second values corresponding to these forces are stored in storing section 20. The first and second values are values obtained by converting the pressing forces received by operating body 2 into electric values in a contact section. The present embodiment has been described using pressure-sensitive conducting contact 18 as the contact section and using a resistance value as the converted electric value. This electric value may use a voltage value detected by control section 19 with the change of the resistance value of pressure-sensitive conducting contact 18. As described above, the first and second values stored in storing section 20 may be an electric value that can be uniquely obtained by pressing operating body 2, or may use a predetermined first set value and a predetermined second set value. This selection may be performed in accordance with variation of elements that constitute remote controller 101 including pressure-sensitive conducting contact 18.

Control range 50 is a range for which a remote control signal is to be generated, and can be obtained as the first value and the second value by adding the maximum pressing force and the minimum pressing force to operating body 2. Next, in order that remote controller 101 generates a remote control signal for remotely controlling electronic device 30, a third pressing force is added to operating body 2 and control section 19 detects a third value.

Control section 19 generates a manipulated signal according to a ratio of a difference between the first value and the second value and a difference between the second value and the third value by means of the first to third values. Electronic device 30 to be controlled is controlled on the basis of the manipulated signal.

Although characteristics of elements such as pressure-sensitive conducting contact 18 have variation if the manipulated signal is generated in such a method, a manipulated signal according to pressing force for pressing operating body 2 can be generated in the range in which pressing force from the minimum pressing force to the maximum pressing force is added to operating body 2.

In other words, since an absolute resistance value obtained from pressure-sensitive conducting contact 18 is not used but a relative value is used, an influence of characteristic variation of elements such as the contact section can be restrained when using remote controller 101 having operating body 2. In particular, when one remote controller 101 is provided with a plurality of operating bodies 2, it is possible to provide remote controller 101 in which a difference of operational feeling between the operating bodies 2 is small.

As a result, it is possible to obtain a remote controller that restrains a malfunction and is simply remotely-controlled.

Since a difference between the second value and the third value is obtained even though control section 19 uses a ratio of a difference between the first value and the third value when calculation is performed by means of the first value to the third value, the same action and effect can be obtained even when other calculations are performed.

By the way, in the above-mentioned description, the configuration for providing the plurality of operating bodies 2 in the plurality of apertures 1*a* included in case 1 to be able to move up and down has been described. In these operating bodies 2, the plurality of operating bodies 2 may be integrated with each other by means of elastomer such as rubber, or sheet-shaped operating body 2 may be used. Even when movable contact 17 on the lower side and pressure-sensitive conducting contact 18 are handled by pressing these operating bodies 2, the same action and effect can be obtained.

In the above-mentioned description, there has been described the configuration in which control section 19 detects electrical connection and disconnection of pressure-sensitive conducting contact 18 and the change of a resistance value and moves cursor 33 and pointer 34 displayed on display screen 31 of electronic device 30 in accordance with the change of pressing force added to operating body 2. However, in accordance with electrical connection and disconnection of pressure-sensitive conducting contact 18 and the change of a resistance value, the displayed menu itself may be moved, or increasing and decreasing a sound volume of electronic device 30 or selection of received channel may be performed without moving cursor 33 and pointer 34.

Moreover, the first set value Rk1 and the second set value Rk2 described in the first embodiment are set in accordance with specifications of control section 19 consisting of a microcomputer or the like.

In the first embodiment, there has been described the configuration in which movable contact 17 is mounted on base sheet 11 as pressure-sensitive conducting contact 18, movable contact 17 is elastically reversed by a pressing operation of operating body 2, and thus electrical connection and disconnection and the change of a resistance value of pressure-sensitive conducting contact 18 are performed. However, even when pressure-sensitive conducting contact 18 is directly pressed from above base sheet 11 by operating body 2 without movable contact 17, or a pressure-sensitive conducting contact is formed by facing conductive sheets and fixed contacts by means of the pressure-sensitive conducting sheets in which conductive particles are dispersed, action and effect of the present invention can be obtained.

A remote controller as described in the present invention can be simply remotely-controlled without a malfunction and thus be used for an electronic device performing remote control of devices such as televisions for home and vehicle, video systems, or air conditioners.

What is claimed is:

1. A method for controlling a remote controller comprising:

pressing an operating body with a first pressing force to obtain a first value;

pressing the operating body with a second pressing force to obtain a second value that is smaller than the first value;

pressing the operating body with a third pressing force to obtain a third value between the first value and the second value;

calculating a ratio of a difference between the second value and the third value to a difference between the first value and the second value; and sending a manipulated signal according to the calculated ratio.

2. A remote controller comprising:

an operating body that receives pressing force;

a contact section that converts the pressing force received by the operating body into an electric value;

a memory for storing a first value and a second value, a first pressing force and a second pressing force being applied to the operating body, the contact section converting the first pressing force into the first value, the contact section converting the second pressing force into the second value, the second value being smaller than the first value; and a controller for sending a manipulated signal based on a ratio of a difference for calculating between the second value and a third value to a difference between the first value and the second value, a third pressing force being applied to the operating body, the contact section converting the third pressing force into the third value.

3. A method for manufacturing a remote controller, the remote controller including:

at least one operating body that receives a pressing force;

a contact section that converts the pressing force received by the operating body into an electric value;

a storing section for storing a first value, which is to be converted by the contact section, and a second value, which is smaller than the first value, after adding a first pressing force and a second pressing force to the operating body; and a control section that adds a third pressing force to the operating body to obtain a third value, calculates a ratio of a difference between the second value and the third value to a difference between the first value and the second value, and sends a manipulated signal based on the calculated ratio, and the method comprising:

comparing a predetermined first set value to the first value;

storing the first value in the storing section when the first value is less than or equal to the predetermined first set value; and storing the predetermined first set value in the storing section in place of the first value when the first value is larger than the predetermined first set value.

4. The method according to claim 3, further comprising:

comparing a predetermined second set value and the second value;

storing the second value in the storing section when the second value is more than or equal to the predetermined second set value; and storing the predetermined second set value in the storing section in place of the second value when the second value is smaller than the predetermined second set value.

5. A method for manufacturing a remote controller, the remote controller including:

at least one operating body that receives pressing force;

a contact section that converts the pressing force received by the operating body into an electric value;

a storing section for storing a first value, which is to be converted by the contact section, and a second value, which is smaller than the first value, after adding a first pressing force and a second pressing force to the operating body; and a control section that adds a third pressing force to the operating body to obtain a third value, calculates a ratio of a difference between the second value and the third value to a difference between the first value and the second value, and sends a manipulated signal based on the calculated ratio, and the manufacturing method comprising:

comparing a predetermined set value and the second value; and storing the second value in the storing section when the second value is more than or equal to the predetermined set value; and storing the predetermined set value in the storing section in place of the second value when the second value is smaller than the predetermined set value.

* * * * *